United States Patent [19]
Madden, Jr.

[11] 3,767,890
[45] Oct. 23, 1973

[54] METHOD AND APPARATUS FOR FABRICATING GAS PRESSURIZED HOLLOW SPHERES

[76] Inventor: Baxter C. Madden, Jr., 680 N. Loop Dr., Camarillo, Calif.

[22] Filed: Oct. 22, 1971

[21] Appl. No.: 191,703

[52] U.S. Cl. ................ 219/137, 29/463, 219/74, 219/60 A, 219/61
[51] Int. Cl. ............................................. B23k 9/00
[58] Field of Search ............... 219/137, 124, 125 R, 219/60 A, 60 R, 61, 72, 74, 75; 29/463, 422, 494; 228/47

[56] References Cited
UNITED STATES PATENTS

| 3,419,950 | 1/1969 | Hall | 29/422 |
| 3,522,647 | 8/1970 | Holcomb et al. | 29/463 |
| 3,592,997 | 7/1971 | Durie | 219/137 |
| 2,970,719 | 2/1961 | Brady, Jr. | 29/463 X |
| 3,018,357 | 1/1962 | Kramer et al. | 219/124 X |

Primary Examiner—J. V. Truhe
Assistant Examiner—L. A. Schutzman
Attorney—Richard S. Sciascia et al.

[57] ABSTRACT

An apparatus and method for joining two identical flanged hollow hemispheres while exposed to an inert gas under pressure to produce a hollow sphere containing pressurized gas. The hemispheres are supported within a pressurized chamber with flanges butting, and rotated so that the flanged portion passes adjacent a welding electrode which effects a welded seam and produces a hermetically sealed sphere containing a gas under pressure.

11 Claims, 4 Drawing Figures

PATENTED OCT 23 1973 3,767,890

METHOD AND APPARATUS FOR FABRICATING GAS PRESSURIZED HOLLOW SPHERES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to thin wall metal spheres and more particularly to a method and apparatus for making such thin walled hollow metal spheres.

2. Description of the Prior Art

Sandwich construction has been in existence for about thirty years. It has become widely used in aircraft and space vehicles and is being considered for applications in lightweight trains and highway cargo carriers as well as in boats and automobiles. Wherever lightweight, high strength, and a high degree of rigidity are required, sandwich construction is of interest.

Basically, this structure consists of two relatively thin solid facings bonded to, and separated by, a core, the design of which affords low weight per unit volume of the space between the two facings. Facings commonly have been made of various metallic materials, plastics, or wood. Common core materials have included balsa wood, foamed plastic, paper honeycomb, glass cloth honeycomb, metal honeycomb, and a variety of repetitive patterns of thin material (metallic or nonmetallic) such as truss, web, tube, waffle, and corrugation.

The major applied loads are carried by the facings which determine the shape of the structural element, its stiffness, and, to a large extent, its stability and strength. However, the latter two parameters, stability and strength, are significantly influenced by the strength of the core and its bond to the facings. The core and its bond prevent the facings from becoming elastically unstable up to the point of failure of either the core or its bond. The core usually does not afford much resistance to loads applied in directions parallel to the plane of the facings since it usually has significant strength only in a direction perpendicular to the facings. Exceptions are balsa wood and foamed plastics, neither of which has great strength in any direction.

For other than foamed-in-place material, the core must be shaped to fit the space between the facings closely. In the use of honeycomb core made of thin high-strength metallic foil, the voids in the honeycomb are temporarily filled with material such as ice, beeswax, hard soap, plastic, or low-temperature-melting alloy to support the foil while it is machined to the required dimensions. After machining, the temporary filling is removed. Such processing of the core is costly. Therefore, a less costly, more effective alternative has been developed: expanded-sphere core.

Because of the importance attached to sphere cores in sandwich construction and particularly to expanded sphere cores some work has been done on their method of formation.

Holcomb in U.S. Pat. No. 3,522,647 describes a method of forming a spherical container comprising two like hemispherical sections, each having inwardly turned annular flanges at the open end lying in the plane of the open end. The hemispherical sections are maintained in a precise aligned manner with the annular flanges in abutting relation and the hemispherical sections are rotated to apply a weld seam line of joinder between the two hemispherical sections.

Rodrigues in U.S. Pat. No. 3,514,839 describes a method of making multi-wall vessels designed to contain pressurized products in which homothetic and co-axial sheathes of revolution are imbricated into each other to allow penetration welding. Each sheath is composed of at least two identical shelves assembled by welding, and connecting means are provided between the sheathes.

The defect in the prior art is that no teaching is shown relating to formation of a sphere containing pressurized gas unless special fittings are added thereto. Furthermore, difficulty is encountered in the prior art in welding the sphere in a suitable manner along the adjoining edges.

SUMMARY OF THE INVENTION

The present invention comprises the apparatus and method for joining two identical flanged hollow hemispheres while exposed to an inert gas under pressure thus producing a hollow sphere containing pressurized inert gas. The hemispheres are rotatably supported in a pressurized chamber with the flanges in an abutting relationship in a plane perpendicular to the axis of rotation. The hemispheres are rotated so that the flanged portion of the sphere thus formed passes adjacent a welding electrode where a welding current is passed through said flanged portions to weld the flanges together and produce an hermetically sealed sphere containing an inert gas under pressure.

OBJECTS OF THE INVENTION

Therefore an object of the present invention is to provide a method and apparatus of manufacturing thin-wall hollow spheres hermetically sealed and containing gas under pressure.

Another object is to provide a method and apparatus capable of producing pressurized spheres in mass production for construction of sandwich cores of superior strength.

Another object is to provide a method and apparatus of producing pressurized spheres which are lightweight, simple and of vast omnidirectional strength.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
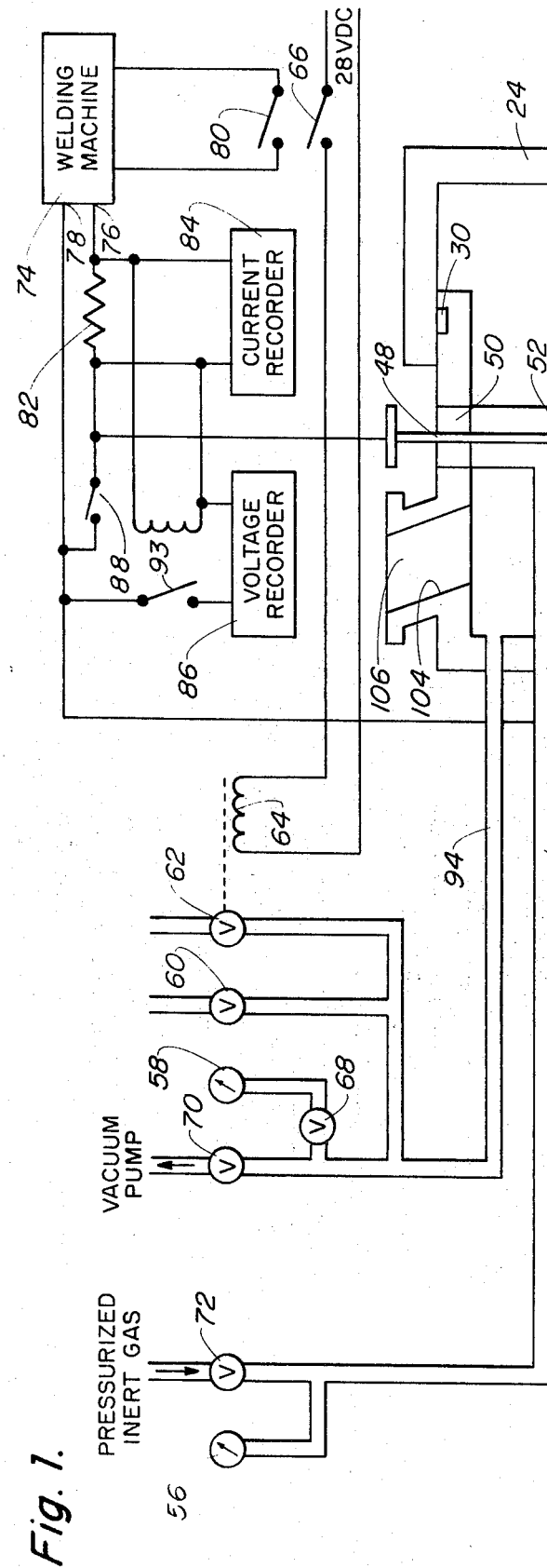
FIG. 1 is a schematic view of the invention showing the pressure chamber with gas and vacuum lines entering therein and with a pair of hemispheres positioned therein adjacent a welding electrode.
Figure 2:
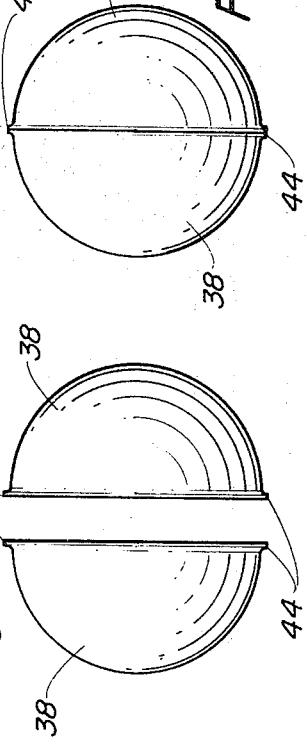
FIG. 2 is a view showing a pair of hemispheres with the flanges in an adjacent relationship.
Figure 3:
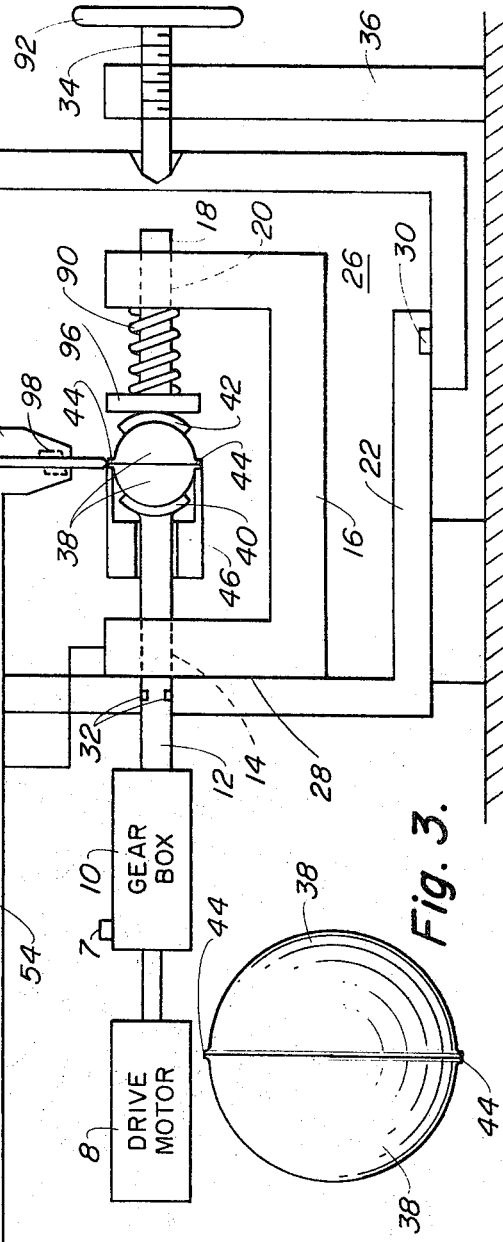
FIG. 3 is a view similar to that of FIG. 2 but with the flanges in abutting relationship and welded together.

Referring to the drawing, there is illustrated a variable speed, reversible, electric motor driven gear box 10 adapted to rotate shaft 12 at a rotational velocity variable from approximately 3 to 12 revolutions per minute. While the foregoing is the preferred rotational velocity, other velocities may be employed if necessary and are within the scope of the disclosure.

As shown, the gear box 10 driven by motor 8 may be provided with a single cycling control means or clutch arrangement such as is common in punch press, duplicating machines, and other single revolution power driven devices whereby upon initiation of rotation of shaft 12 such as by remote control through a circuit including input connection 7 the shaft 12 rotates through a single cycle of about 370 degrees and then stops.

Shaft 12 rotates in bearing 14 positioned in support frame 16 and is in axial alignment with shaft 18 which also rotates in support frame 16 and within bearing 20. It will be noted that cups 40 and 42 are mounted on each inner end of shafts 12 and 18 respectively with shaft 18 being slidable within bearing 20. Shaft 18 is also biased toward shaft 12 by spring 90 maintained in position about shaft 18 by support frame 16 and spring retention element 96 mounted near the end of said shaft 18.

A gas tight vessel 22 closed at one end by removable cap 24 forms the chamber 26 and encloses the support frame 16 and associated structure substantially as shown in FIG. 1. The support frame 16 is attached at 28 to the inner surface of vessel 22. An O-ring seal 30 prevents leakage at the joint between cap 24 and vessel 22 and O-ring seal 32 minimizes gas leakage where shaft 12 passes through vessel 22 into chamber 26.

Cap 24, as has been indicated, is removable to provide access to the interior of chamber 26. Screw 34 is equipped with a handle 92 and threads into a suitably threaded support 36 for securing the cap 24 in position when chamber 26 is pressurized.

It will be seen that two flanged identical preformed hemispheres 38 are positioned with their flanges 44 in an abutting relationship between cup 40 mounted on one end of shaft 12 and cup 42 mounted on one end of shaft 18 and are maintained in such position by the spring loaded shaft 18 which, as described above, is free to slide in its bearing 20. The flange alignment element 46 is mounted on shaft 12 and is adapted to align the flanges 44 of hemispheres 38 so that they are in a plane perpendicular to the axis of shaft 12.

The electrode 48 passes through the wall of vessel 22 into chamber 26 and is secured in a gas tight member 50 which also electrically insulates the electrode from vessel 22. Member 50 permits the electrode 48 to be easily removed for repair or for proper alignment and spacing in relation to the plane of the hemisphere flanges 44. Near its lower end, electrode 48 passes through a rotatable eccentric bushing 98 for precise alignment in the plane of flange 44 abutment.

The shroud 52 is of adjustable length and surrounds electrode 48. It is connected with tubing 54 through which an inert gas is directed into the shroud 52 and against the hemisphere flanges 44. A portion of tube 54 within chamber 26 is fabricated of an electrically insulating material and shroud 52 is made of high temperature resistant material.

A view port 104 closed by a window of transparent material 106 is mounted in the wall of vessel 22 and permits a clear view of the interior of chamber 26 thus enabling the welding arc to e observed.

As shown in FIG. 1 a pressure gage 56 indicates gas pressure above atmospheric in chamber 26. A vacuum gage 58 connected to vacuum tubing 94 indicates gas pressure below atmospheric in chamber 26. Valve 60 allows gas pressure within the chamber 26 to be brought to atmospheric pressure. Valve 62 is operated by solenoid 64 controlled by a switch 66 and controls the bleed rate of inert gas. Valve 68 isolates the vacuum gage 58. Valve 70 positioned in vacuum tubing 94 isolates the vacuum pump not shown in the drawing and valve 72 positioned in inert gas line 54 isolates the pressurized inert gas source also not shown in the drawing.

The electrode 48 is connected to an arc welding machine 74 at the electrode connection 76 and shafts 12 and 18 as well as support frame 16 are electrically connected to the ground connection 78 on the same arc welding machine 74. Switch 80 starts the welding current and switch 88 terminates the welding current. Switch 66 is a microswitch mounted on switch 80. Resistor 82 is positioned external to the welding machine 74. One pen recorder 84 is employed to record current during the welding cycle and a second pen recorder 86 is utilized to record voltage across the arc upon closing of solenoid operated switch 93 after termination of the high frequency, high starting voltage.

OPERATION OF THE APPARATUS

Cap 24 is removed from vessel 22 and an electrode 48 is installed. The two flanged hemispheres 38 are inserted in cups 40 and 42 by sliding shaft 18 against the bias of spring 90, placing said hemispheres 38 in the position shown and then releasing shaft 18. Alignment of the hemisphere flanges 44 is effected by sliding the flange alignment element 46 against the nearest flange and then retracting it. The electrode 48 is aligned with the plane between flanges 44 and the gap between the electrode tip and flanges 44 is adjusted. Shroud 52 is set at its maximum length exposing only a small portion of the electrode tip.

Cap 24 is fitted to vessel 22 and forced over the O-ring seal 30 by rotating the handle 92 on screw 34 as shown.

Valves 60, 62 and 72 are then closed and valves 68 and 70 are opened and the vacuum pump, not illustrated, is operated causing the chamber to be evacuated via tubing 94. When vacuum gage 58 indicates maximum obtainable vacuum, valves 68 and 70 are closed. Valve 72 is operated to pressurize the chamber 26 to the desired degree which has been preset on the regulator valve of the pressurized inert gas source. Pressure gage 56 indicates the pressure of chamber 26 after pressurizing is completed at about 60 p.s.i. However, any appropriate pressure may be employed depending upon sphere material and intended use.

The motor 8 attached to gear box 10 is then operated to rotate the hemisphere flanges 44 past the electrode 48. Valve 62 having been adjusted for the desirable rate of intermittent flow of inert gas past the electrode 48 (approximately 1.25 cubic feet per minute), is opened by depressing microswitch 66 approximately 5 seconds before the start of welding. The welding machine 74 is then operated at least for approximately 370° of rotation of the hemispheres. Switch 88 is then closed. Switches 80 and 66 are then opened. Valve 72 is then closed. Valve 60 is fully opened. When atmospheric pressure exists in the chamber, the cap 24 is removed. The two hemispheres 38 having been welded together in a pressurized environment have become an hermetically sealed, hollow sphere containing gas under pressure substantially at 60 p.s.i. The thus formed pressurized sphere is removed from cups 40 and 42 by retracting shaft 18 against the pressure of spring 90. When it is desired to record the electrical current through the arc and the voltage across the arc, the two pen recorders 84 and 86 are operated during the welding cycle.

Instead of pressurizing chamber 26 with an inert gas, a pellet of solid material, including carbon dioxide, may be placed in the interior of the abutting hemispheres 38. The pellet will become a gas at an appropriate temperature depending on the type of solid material employed. The pressure will depend upon the quantity of the solid material of the pellet.

Figure 4:
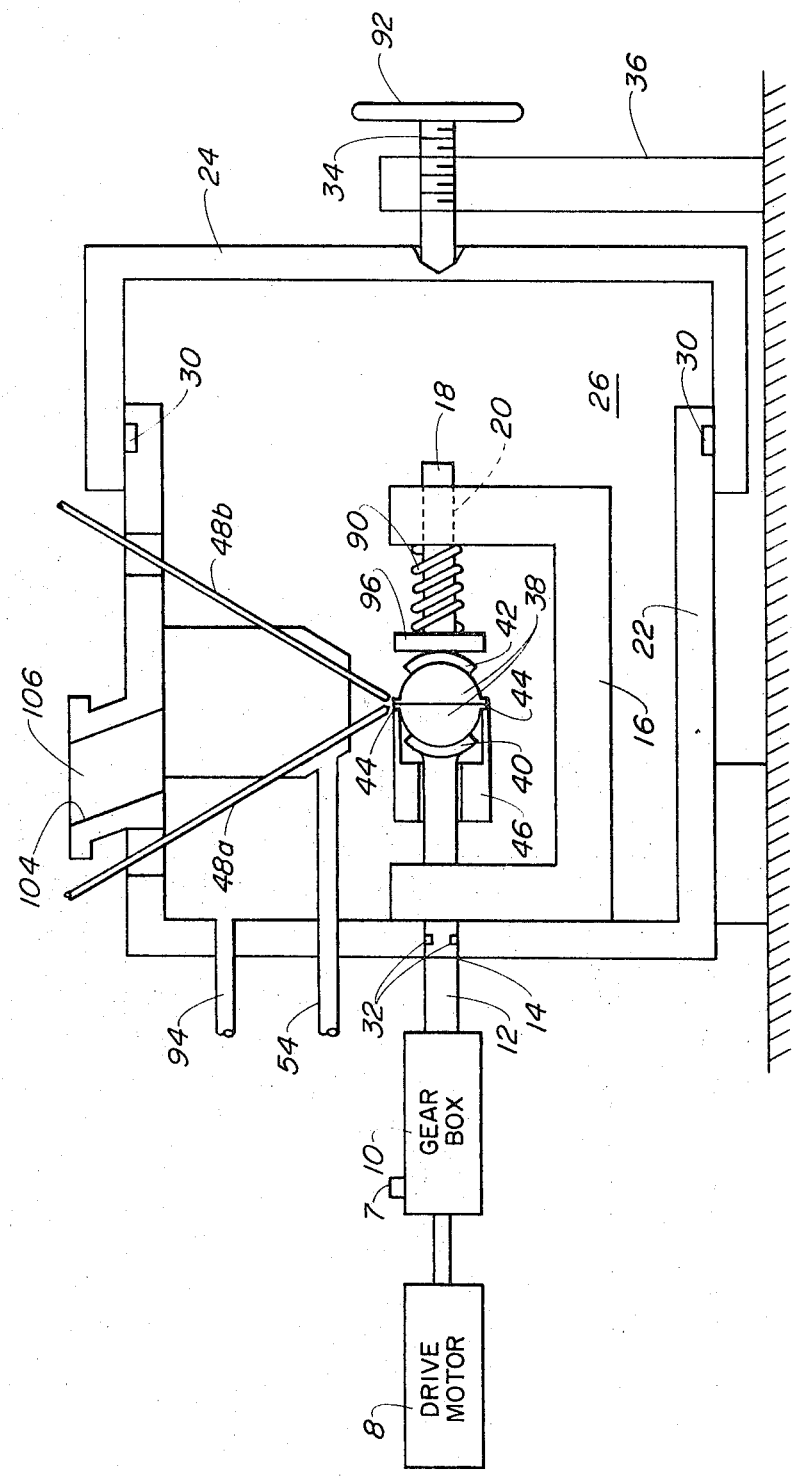
FIG. 4 is a schematic view of the pressure chamber showing a pair of electrodes angularly mounted so that their tips form a gap adjacent a material to be joined.

A further modification is shown in FIG. 4 in which two electrodes 48a and 48b provide a source of heat for melting and welding the abutting flanges 44 of hemispheres 38 fabricated from a material other than metal.

The process set forth herein is manually operated. However, it is susceptible to automation and high speed production.

Obviously many modifications and variations of the present invention are possible in the light of the above teachings. It is therefore to be understood that within the scope of the appended claims the invention may be practiced otherwise than as specifically described.

I claim:

1. A device for joining two identical flanged hollow hemispheres while exposed to an gas thus forming a thin wall hollow sphere containing a pressurized gas comprising:
   a chambered vessel being open at one end;
   means to close the seal and open end of the vessel;
   an electrode mounted in the wall of said vessel with the operative tip positioned in the vessel chamber, said electrode being electrically insulated from the vessel;
   means positioned in said vessel chamber for supporting said hemispheres with the flanges in an abutting relationship and properly spaced from the electrode, said means adapted to rotate the hemispheres past the electrode;
   means to evacuate air from within said sealed vessel;
   means to pressurize the chamber within said sealed vessel, and;
   means to activate said electrode;
   wherein the flanges are welded to effect a continuous gas tight joint.

2. The device as defined in claim 1 wherein:
   said means to close and seal the open end of the vessel is a cap with a lock screw adapted to screw against the exterior surface of said cap securing the same in an hermetical sealing relationship with the vessel.

3. The device as defined in claim 1 wherein:
   said means for supporting said hemispheres comprises a support frame mounted in the chamber of said vessel;
   a first shaft rotatably positioned in the wall of said vessel and supported in said support frame;
   means attached to said first shaft and adapted to rotate the same at a suitable rotational velocity;
   a second shaft rotatably mounted in said support frame in axial and spaced relationship to said first shaft, said second shaft being slidably mounted in said support frame;
   a spring positioned about said second shaft and adapted to bias the same axially toward the first shaft; and
   cups attached to the inner adjacent ends of each of the first and second shafts, said cups adapted to hold the flanges of the hemispheres in contiguous abutting relationship operatively adjacent the welding electrode.

4. The device as defined in claim 3 wherein:
   a flange alignment member is positioned about said first shaft and is adapted to align the hemisphere flanges so that they are in a plane perpendicular to the axis of said first shaft.

5. The device as defined in claim 1 wherein:
   a shroud of adjustable length surrounds the electrode and is attached to tubing through which an inert gas is directed into said shroud and against the hemisphere flanges thus pressurizing said vessel chamber and providing adjustable temperature control of the molten material, said shroud being fabricated of a high temperature resistant material.

6. The device as defined in claim 5 wherein a pair of electrodes are angularly positioned in the wall of said vessel with the tips thereof adjacent the lower end of said shroud to provide a source of heat for welding the abutting flanges of hemispheres fabricated.

7. A method of joining two identical thin walled flanged hollow hemispheres while exposed to an inert fluid under pressure thus forming a thin wall hollow sphere containing a pressurized fluid comprising:
   supporting a pair of said hemispheres in the sealed chamber of a hollow vessel with the hemisphere flanges in abutting relationship;
   postioning a welding electrode adjacent said hemispheres;
   hermetically sealing said vessel with a cap over one end thereof;
   subjecting the chamber interior and abutting hemispheres therein to pressure reduction so as to extract all possible air from both the hemispheres and chambers;
   pressurizing said chamber with an inert fluid; and
   energizing said electrode to weld said hemispheres thus producing a hollow sphere containing pressurized fluid.

8. The method as defined in claim 7 wherein:
   said hemispheres are aligned with the flanges positioned adjacent the welding electrode prior to energizing said electrode.

9. The method as defined in claim 8 wherein:
   said abutting hemisphere flanges are rotated past the welding electrode while said electrode is being energized.

10. The method of claim 7 wherein said inert fluid is a gas.

11. A method of joining two identical thin walled flanged hollow hemispheres to form a thin wall hollow shere containing a pressurized fluid comprising:
   inserting a solid pellet in the interior of said abutting hemispheres, said pellet to become a gas at the gasification temperature of the pellet employed;
   supporting said hemispheres in the sealed chamber of a hollow vessel with the hemisphere flanges in abutting relationship;
   positioning a welding electrode adjacent said hemispheres, and
   energizing said electrode to weld said hemispheres thus producing a hollow sphere containing pressurized fluid.

* * * * *